United States Patent
Suzuki et al.

(10) Patent No.: US 7,102,312 B2
(45) Date of Patent: Sep. 5, 2006

(54) MOTOR DRIVING APPARATUS, DRIVING METHOD THEREOF AND MOBILE TERMINAL

(75) Inventors: Masahiro Suzuki, Kanagawa (JP); Masafumi Kikuchi, Kanagawa (JP); Akira Fujino, Kanagawa (JP); Mitsuru Shibasaki, Kanagawa (JP); Hitoshi Suzuki, Kanagawa (JP); Shun Kayama, Saitama (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 10/511,321

(22) PCT Filed: Apr. 22, 2003

(86) PCT No.: PCT/JP03/05106

§ 371 (c)(1),
(2), (4) Date: Aug. 15, 2005

(87) PCT Pub. No.: WO03/090340

PCT Pub. Date: Oct. 30, 2003

(65) Prior Publication Data

US 2006/0001389 A1    Jan. 5, 2006

(30) Foreign Application Priority Data

Apr. 22, 2002   (JP) .............................. 2002-118939

(51) Int. Cl.
*H02P 27/00* (2006.01)
*H02P 27/04* (2006.01)
(52) U.S. Cl. ...................... 318/439; 318/599; 318/254; 318/138; 318/807
(58) Field of Classification Search ..................... None
See application file for complete search history.

(56) References Cited

U.S. PATENT DOCUMENTS

| | | | | |
|---|---|---|---|---|
| 5,166,583 A | * | 11/1992 | Min et al. | 318/138 |
| 5,777,449 A | * | 7/1998 | Schlager | 318/459 |
| 5,943,214 A | * | 8/1999 | Sato et al. | 361/752 |
| 6,064,175 A | * | 5/2000 | Lee | 318/809 |

(Continued)

FOREIGN PATENT DOCUMENTS

EP       730341 A2  *  9/1996

(Continued)

OTHER PUBLICATIONS

International Search Report dated Aug. 5, 2003.

*Primary Examiner*—Lincoln Donovan
*Assistant Examiner*—Eduardo Colon Santana
(74) *Attorney, Agent, or Firm*—Rader, Fishman & Grauer PLLC; Ronald P. Kananen (57) ABSTRACT

A motor driving apparatus and a driving method thereof, and a mobile terminal in which a terminal voltage value of a terminal is detected at a terminal voltage detection unit, and is held in a holding circuit. A difference between the terminal voltage value detected this time and the terminal voltage value detected last time and held in the holding circuit is calculated in a difference circuit, and the calculated difference voltage value is compared with a reference voltage value determining a rated frequency in a comparator. A synchronizing reference voltage value of a reference voltage source is controlled by a control circuit on the basis of each comparison result in the comparators and a frequency of a synchronizing reference signal specified as a basic operation time unit at the time of synchronous driving is corrected so that a stable synchronous operation condition can be obtained before a rotor of a brushless motor steps out from a synchronous operation.

10 Claims, 5 Drawing Sheets

U.S. PATENT DOCUMENTS

| | | | |
|---|---|---|---|
| 6,111,372 A * | 8/2000 | Nishimura | 318/254 |
| 6,122,131 A * | 9/2000 | Jeppson | 360/77.02 |
| 6,462,491 B1 * | 10/2002 | Iijima et al. | 318/254 |
| 6,680,590 B1 * | 1/2004 | Inoue et al. | 318/114 |
| 6,771,033 B1 * | 8/2004 | Kokami et al. | 318/138 |
| 6,900,604 B1 * | 5/2005 | Kokami et al. | 318/254 |
| 6,901,212 B1 * | 5/2005 | Masino | 318/254 |
| 6,922,032 B1 * | 7/2005 | Maeda | 318/373 |
| 6,946,808 B1 * | 9/2005 | Kandori | 318/254 |
| 6,979,970 B1 * | 12/2005 | Iwanaga et al. | 318/599 |
| 2004/0080293 A1 * | 4/2004 | Kurosawa et al. | 318/459 |
| 2004/0183490 A1 * | 9/2004 | Maeda | 318/375 |
| 2005/0067986 A1 * | 3/2005 | Kurosawa et al. | 318/254 |
| 2005/0189892 A1 * | 9/2005 | Kokami et al. | 318/254 |
| 2005/0258788 A1 * | 11/2005 | Mori et al. | 318/254 |
| 2006/0044664 A1 * | 3/2006 | Itagaki et al. | 360/73.03 |

FOREIGN PATENT DOCUMENTS

| | | |
|---|---|---|
| EP | 840439 A1 * | 5/1998 |
| JP | 1-103194 A | 4/1989 |
| JP | 8-186995 A | 7/1996 |
| JP | 2000-69792 A | 3/2000 |
| JP | 2000-232800 A | 8/2000 |
| JP | 2001-95294 A | 4/2001 |
| JP | 2001-178183 A | 6/2001 |

* cited by examiner

MOTOR DRIVING APPARATUS, DRIVING METHOD THEREOF AND MOBILE TERMINAL

TECHNICAL FIELD

The present invention relates to a motor driving apparatus, a driving method thereof and a mobile terminal typified by a mobile phone, and, more particularly, to a motor driving apparatus of a so-called sensorless system having no position detection sensor for detecting a movement position of a rotor, a driving method thereof and a mobile terminal mounted with the driving apparatus.

BACKGROUND ART

Conventionally, as a brushless motor driving apparatus of a sensorless system, there has been known a configuration that, for a duration of a rated operation, compares a back electromotive force generated in a non-drive conditioned motor coil phase with a neutral voltage of star-connected three-phase motor coils, waits (a zero-cross detection) for a time that a polarity determined by the comparison is inverted, and with the polarity-inverted time as a rotor position detection signal, and further after an addition of an appropriately set delay time, performs a transition to a next driving condition (See Japanese Patent Application Publication Laid-open No. HEI 9-47078, for instance). This brushless motor driving apparatus is operative, at a starting time of the motor, to start the motor by switching a driving phase forcibly with no rotor position detected by a synchronizing signal obtained from a driving apparatus-side oscillator in a period from a start to a low speed region.

However, the brushless motor driving apparatus according to the related art of the above configuration requires that sensing be performed continuously until a zero-cross signal indicating an inversion of the polarity determined by the comparison between a detected value of the back electromotive force and the neutral voltage is obtained, so that there is no denying a weakness to an external noise in a period before the zero-cross signal is obtained. Further, the above period necessitates a suppression of noise generation and hardly changes an output driving condition, so that a performance, such as an efficient change of a driving duty with a load amount, also is hardly increased.

Further, no generation of the back electromotive force at the starting time leads to a need for a dedicated starting circuit, and, in addition to this circuit, back electromotive force detection amplifiers equivalent in number to phases and some function circuits, such as an offset correction circuit for the above amplifiers, a noise removal circuit and a driving phase correction circuit are also required. Accordingly, a circuit configuration is easily complicated as a whole of the apparatus. This means that a power saving, a cost reduction and a downsizing of the brushless motor driving apparatus are hardly achieved.

Furthermore, there is also the need for a connection to extract the neutral voltage, so that in the case of the three-phase motor, for instance, the number of connections to connect the coils to the driving apparatus basically comes to four. When the driving apparatus is integrated into a motor apparatus, the smaller number of connections increases a degree of freedom of a circuit arrangement. In the brushless motor driving apparatus according to the related art, an attempt to carry out three connections, when being made, raises problems such as a degraded driving efficiency and a degraded operation stability caused by an addition of the correction circuit for correcting a zero-cross detection error or an acceptance of the detection error as it is. Thus, a use of the four connections is supposed to be indispensable, resulting in a restriction on the degree of freedom of the circuit arrangement when the driving apparatus is integrated into the motor apparatus.

The present invention has been made in view of the above problems and is intended to provide a motor driving apparatus, which may perform stable driving for revolutions with a relatively simple circuit configuration without being affected by an external noise, enables a low power consumption, a downsizing and a cost reduction to be achieved, and, besides, ensures a high degree of freedom of a circuit arrangement, a driving method thereof and a mobile terminal mounted with the driving apparatus.

DISCLOSURE OF THE INVENTION

To attain the above object, the present invention employs, in a driving apparatus of a single-phase or a multiple-phase motor having a rotor provided with a magnet and a stator provided with one or more driving coils, a configuration that, in a process of a transition to a rated operation mode or after the transition to the rated operation mode, detects a value of a back electromotive force generated in driving coils, detects a phase error by comparing a last detected value with a present detected value on the same phase, and, depending on a result of the comparison, controls a frequency of a synchronizing reference signal specified as a basic operating time unit or a power-supply voltage supplied to a drive output unit of the driving coils. In a mobile terminal typified by a mobile phone mounted with a vibrating motor to sense a reception by a vibrator, the motor driving apparatus is used as a motor driving apparatus for driving the vibrating motor.

In the motor driving apparatus of the above configuration or the mobile terminal mounted with the driving apparatus, when detecting the back electromotive force generated in the driving coils, a zero-cross detection of the back electromotive force is not performed, but the back electromotive force value (level) itself is compared with a back electromotive force value of the same phase in a last condition, and the frequency of the synchronizing reference signal is changed to an appropriate frequency depending on the result of the comparison, that is, the frequency of the synchronizing reference signal is controlled so as to eliminate the phase error. Thereby, a synchronous operation is conditioned to be stable before the rotor of the motor causes a step out from the synchronous operation.

BEST MODES FOR IMPLEMENTING THE INVENTION

Embodiments of the present invention are hereinafter described in detail with reference to the accompanying drawings.

FIRST EMBODIMENT

Figure 1:
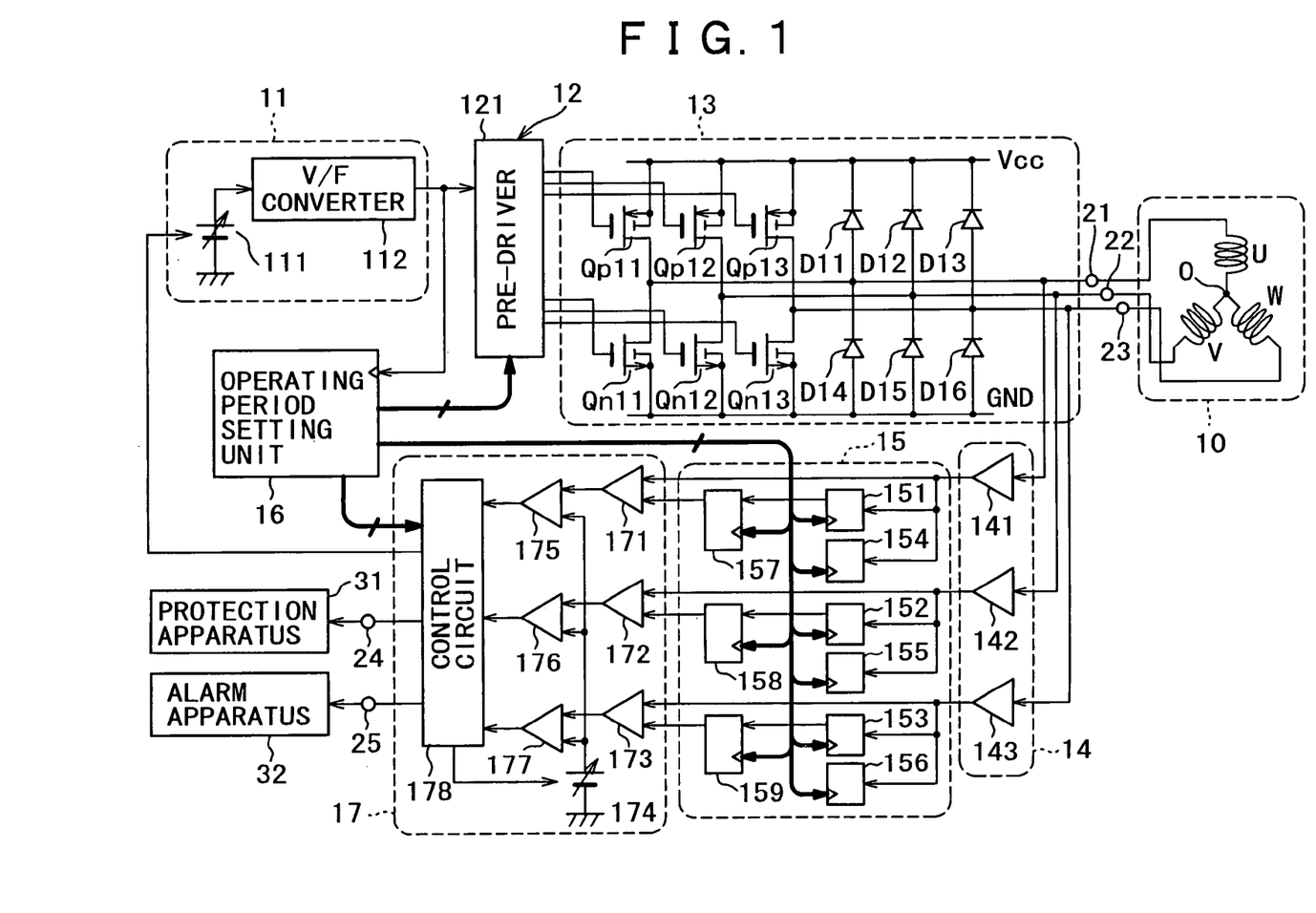
FIG. 1 is a block diagram showing an instance of a configuration of a brushless motor driving apparatus according to a first embodiment of the present invention.

FIG. 1 is a block diagram showing an instance of a configuration of a brushless motor driving apparatus according to a first embodiment of the present invention. In the present embodiment, a three-phase DC brushless motor 10 having a rotor provided with a magnet and a stator provided with three-phase driving coils U, V and W, for instance, is applied to an object of driving. However, the object of driving is not limited to the three-phase DC brushless motor, and the brushless motor driving apparatus according to the present embodiment is also applicable to drive a multiple-phase or a single-phase DC brushless motor other than the three-phase DC brushless motor.

As is obvious from FIG. 1, the brushless motor driving apparatus according to the first embodiment has, as basic elements, a synchronizing reference signal generation unit 11, a driving control unit 12, a drive output unit 13, a terminal voltage detection unit 14, a terminal voltage holding unit 15, an operation period setting unit 16 and a synchronous control unit 17, is used in an IC-implemented condition, for instance, and is equipped with at least five terminals 21 to 25. The terminals 21, 22 and 23 are connected respectively to one end each of the three-phase driving coils U, V and W of the brushless motor 10.

Also, the terminal 24 is connected to a protection apparatus 31, and the terminal 25 is connected to an alarm apparatus 32. Here, when an abnormal condition such as a step out from a synchronous operation of the rotor of the brushless motor 10 occurs the protection apparatus 31 performs, a protection processing to disconnect power, for instance. By the way, the alarm apparatus 32 gives an alarm, etc. to alert a user to the effect that an activation of the protection apparatus 31 due to an occurrence of the abnormal condition results in a stopped condition of the motor 10. Incidentally, for the protection apparatus 31, an IC-integrated configuration is also available.

The synchronizing reference signal generation unit 11 has a reference voltage source 111 with a variable voltage value and a V/F converter 112 for converting a synchronizing reference voltage value (V) supplied from the reference voltage source 111 into a frequency (F) and generates, depending on the synchronizing reference voltage value supplied from the reference voltage source 111, a synchronizing reference signal specified as a basic operating time unit in the case of a synchronous driving. The generated synchronizing reference signal is supplied to the driving control unit 12. The driving control unit 12 comprises a pre-driver 121 and controls an energizing to the driving coils U, V and W of the brushless motor 10 depending on the synchronizing reference signal generated by the synchronizing reference signal generation unit 11 and various timing signals supplied from the operation period setting unit 16.

The drive output unit 13 has PMOS transistors Qp11, Qp12 and Qp13 connected between a first power source, that is, a positive power source Vcc and the terminals 21, 22 and 23, and NMOS transistors Qn11, Qn12 and Qn13 connected between the terminals 21, 22 and 23 and a second power source, that is, a ground (GND), and supplies a drive current to the three-phase driving coils U, V and W through the terminals 21, 22 and 23 under driving control of the driving control unit 12. Incidentally, diodes D11 to D16 for absorbing a back electromotive force are connected between the positive power source Vcc and the terminals 21, 22 and 23 and between the terminals 21, 22 and 23 and the ground.

The terminal voltage detection unit 14 has three detection amplifiers 141, 142 and 143 provided in correspondence to the three-phase driving coils U, V and W and detects voltage values (terminal voltage values) generated in the terminals 21, 22 and 23. In the terminals 21, 22 and 23, the voltage values meeting levels of the back electromotive force generated in the three-phase driving coils U, V and W are generated when the rotor of the motor 10 is revolving. The terminal voltage values detected by the terminal voltage detection unit 14 are supplied to the terminal voltage holding unit 15 and the synchronous control unit 17.

The terminal voltage holding unit 15 is composed of holding circuits 151, 152 and 153 for holding positive-side detected voltage values obtained by the detection amplifiers 141, 142 and 143, holding circuits 154, 155 and 156 for holding negative-side detected voltage values, and selection circuits 157, 158 and 159 for selecting either of the positive-side an the negative-side detected voltage values (the held voltage values) held in these holding circuits. Here, a holding timing of the holding circuits 151 to 156 and a selection timing of the selection circuits 157 to 159 are determined by the timing signals supplied from the operation period setting unit 16.

The operation period setting unit 16 is composed of a counter for counting the synchronizing reference signal generated by the synchronizing reference signal generation unit 11 and a timing generation circuit for generating various timing signals depending on a count value of the counter, and it supplies the generated timing signals to the driving control unit 12, the terminal voltage holding unit 15 and the synchronous control unit 17, respectively. Here, the timing signal supplied to the driving control unit 12 sets a period in which least one phase of the driving coils U, V and W is conditioned to be non-drive. The timing signal supplied to the terminal voltage holding unit 15 sets a period that the terminal voltage holding unit 15 is conditioned to be operative during the period for which at least one phase is non-drive.

Incidentally, while the present embodiment employs a configuration that sets the holding timing of the holding circuits 151 to 156 by the timing signals supplied from the operation period setting unit 16, each voltage value detected by the detection amplifiers 141, 142 and 143 is sure to be temporarily held in the holding circuits 151 to 156, so that the holding timing of the holding circuits 151 to 156 may be referred to, in other words, as a period (a terminal voltage value detecting period) in which the detection amplifiers 141, 142 and 143 are conditioned to be operative. Thus, it also may be stated that setting of the period in which the detection amplifiers 141, 142 and 143 are conditioned to be operative is performed using the timing signals supplied from the operation period setting unit 16.

Further, while the present embodiment also employs a configuration that has two systems of the holding circuits to hold the positive-side and the negative-side detected voltage values, it is not always necessary to provide the two systems of holding circuits, and either of the two systems is also available as the holding circuits. However, the use of the two systems of holding circuits allows the detecting points of the terminal voltage value to be doubled, so that phase detection accuracy may be increased more than that in the case where one system is used.

The synchronous control unit 17 is composed of three difference circuits 171, 172 and 173 provided in correspondence to the three-phase driving coils U, V and W, a reference voltage source 174, three comparators 175, 176 and 177 provided in correspondence to the three-phase driving coils U, V and W, and a control circuit 178. The difference circuits 171, 172 and 173 calculate differences between the detected voltage values directly supplied from the detection amplifiers 141, 142 and 143 of the terminal voltage detection unit 14 and the voltage values held in the holding circuits 151, 152 and 153 or the holding circuits 154, 155 and 156 of the terminal voltage holding unit 15 and supplied through the selection circuits 157, 158 and 159 and output the calculated difference voltage values.

The reference voltage source 174 sets a reference voltage value applied to determine a rated rotational speed (a rated speed) of the motor 10. This voltage value is supposed to be variable. The comparators 175, 176 and 177 compare, using the reference voltage value set by the reference voltage source 174 as a difference reference value, the difference reference value with each difference voltage value obtained by the difference circuits 171, 172 and 173 and supply, to the control circuit 178, the reference voltage value as it is when the comparison results in 0, that is, in the absence of an error, or a voltage value obtained by adding or subtracting an error factor to or from the reference voltage value in the presence of the error.

The control circuit 178 controls such that the synchronous operation is conditioned to be stable before the rotor of the motor 10 causes step out from the synchronous operation, by controlling (correcting) the synchronizing reference voltage value of the reference voltage source 111 in the synchronizing reference signal generation unit 11 depending on the result of each comparison by the comparators 175, 176 and 177 to change, to the appropriate frequency, the synchronizing reference signal specified as the basic operating unit time in the case of the synchronous driving, and also drives the protection apparatus 31 and the alarm apparatus 32 by outputting an abnormality detection signal through the terminals 24 and 25 when the occurrence of the abnormal condition, such as the step out, is detected on the basis of the result of each comparison by the comparators 175, 176 and 177.

When a speed difference of an operating speed of the rotor from an arbitrarily determined rated synchronous speed is caused, the control circuit 178 further corrects the reference voltage value (the difference reference value) of the reference voltage source 174 depending on the speed difference. Specifically, setting of the reference voltage value is performed so as to bring about a higher sensitivity in a high rotational speed region. Thereby, increased accuracy of the synchronous operation control may be achieved.

A circuit operation of the brushless motor driving apparatus of a sensorless system according to the first embodiment of the above configuration is now described. In the brushless motor driving apparatus according to the present embodiment, a brushless motor, such as a fan motor or a vibrating motor with relatively small load variations, is applied to the object of driving.

When driving the motor with the relatively small load variations, there is no need for phasing, so that the motor is supposed to perform an operating action in a correct phase relation only by generating a drive waveform at an optimum driving frequency for driving on the basis of the generated drive waveform. In view of the above actual circumstances, the brushless motor driving apparatus according to the present embodiment is operative to firstly start the motor 10 at a starting frequency (an initial revolution frequency), and after the start of the motor, make a transition from a start mode to a rated operation mode under the control of the synchronous control unit 17 using a synchronous system that changes the frequency (an oscillation frequency) of the synchronizing reference signal generated by the synchronizing reference signal generation unit 11 to a rated rotation frequency.

In the process of the transition to the rated operation mode or after the transition to the rated operation mode, the back electromotive force generated in the driving coils U, V and W of the motor 10 is detected, and the control is performed by the synchronous control unit 17 so as to eliminate the phase error, in which case, while a conventional technology detects a zero cross of the back electromotive force and performs the control on the basis of a detection output of the detected zero cross so as to eliminate the phase error, the present embodiment employs the configuration that detects the phase error by comparing the back electromotive force level itself with the back electromagnetic force level of the same phase in the last condition and performs the control on the basis of the result of the comparison so as to eliminate the phase error. A specific circuit operation of the above configuration is described in the following.

Firstly, the terminal voltage detection unit 14 detects the terminal voltage values of the terminals 21, 22 and 23, that is, the back electromotive force levels of the driving coils U, V and W with the detection amplifiers 141, 142 and 143 provided in correspondence to the three-phase driving coils U, V and W.

Figure 2A:
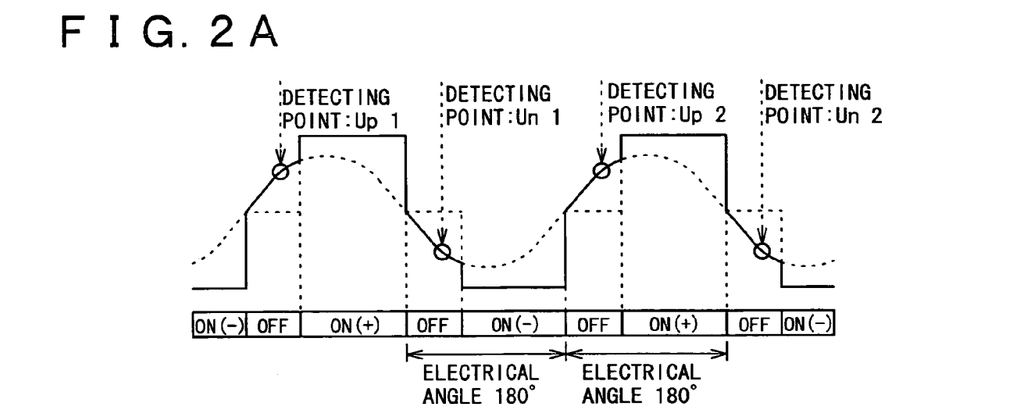
FIG. 2A is a view showing each terminal voltage waveform of a U phase.
Figure 2B:
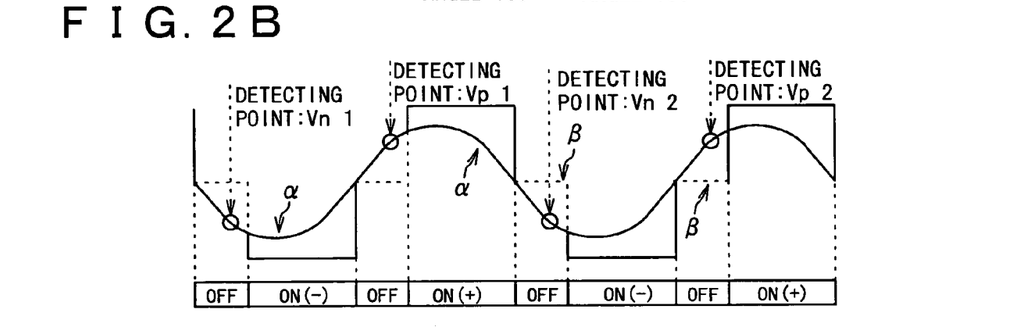
FIG. 2B is a view showing each terminal voltage waveform of a V phase.
Figure 2C:
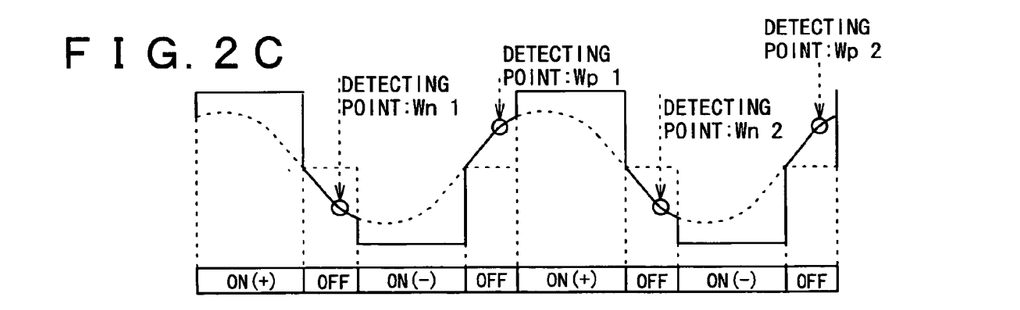
FIG. 2C is a view showing each terminal voltage waveform of a W phase.
Figure 2D:
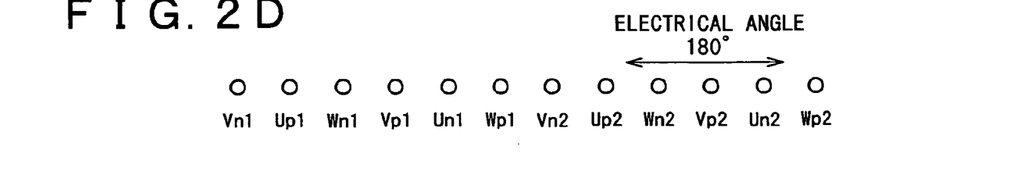
FIG. 2D is a view showing a timing relation of terminal voltage detecting positions (detecting points) of all the phases.

FIG. 2A shows each terminal voltage waveform of a U phase, FIG. 2B shows each terminal voltage waveform of a V phase, FIG. 3B shows each terminal voltage waveform of a W phase, and FIG. 2D shows a timing relation of terminal voltage detecting positions (detecting points) of all the phases.

Figure 3:
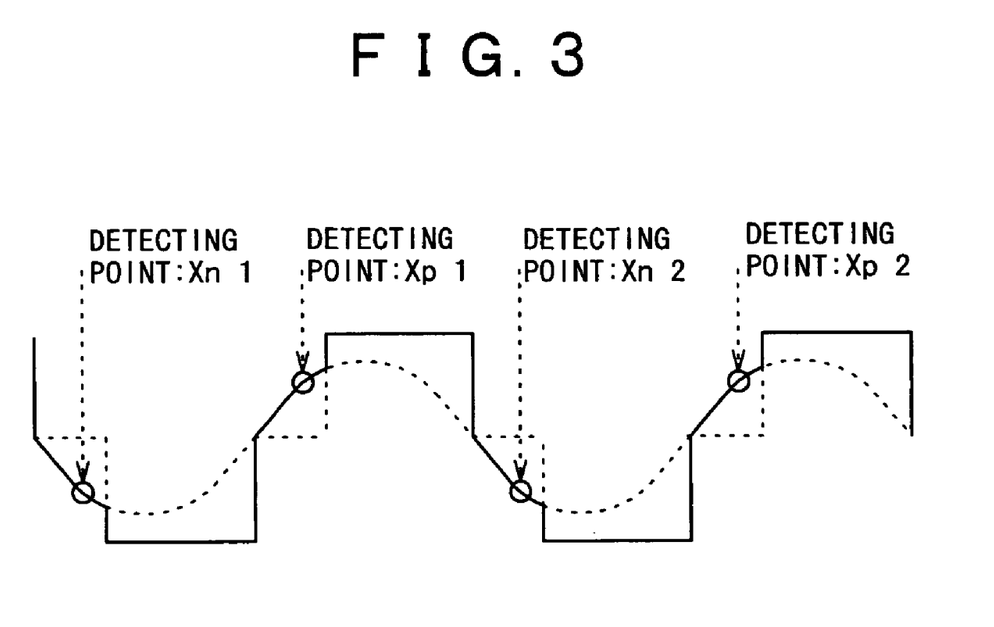
FIG. 3 is a waveform diagram showing a terminal voltage waveform of a certain phase (an X phase) in a stable synchronous condition, together with voltage values at the detecting points.

FIG. 3 shows a terminal voltage waveform of a certain phase (an X-phase) in a stable synchronous condition, together with voltage values at the detecting points.

In FIGS. 2A to 2D, a dotted line in a waveform of a sine wave represents a back electromotive force curve ($\alpha$) yielded from a rotor motion, and a dotted line in a waveform of a rectangular wave represents a terminal voltage waveform ($\beta$) in the absence of the back electromotive force, such as the case where the rotor was stopped. Also, a period (ON (+), ON (−)) that the driving control unit 12 brings in the energized condition and a period (OFF) that the driving control unit 12 brings in the non-drive condition are determined by the timing signals supplied from the operation period setting unit 16.

Each voltage value detected by the detection amplifiers 141, 142 and 143 is captured to the positive-side holding circuits 151, 152 and 153 or the negative-side holding circuits 154, 155 and 156 of the terminal voltage holding unit 15 and is held therein depending on the detecting points (positions) on the basis of the timing signals supplied from the operation period setting unit 16. When the timing signals are outputted at the next detecting point from the operation period setting unit 16 to the selection circuits 157, 158 and 159, the selection circuits 157, 158 and 159 select, in response to the supplied timing signals, the terminal voltage values held in the positive-side holding circuits 151, 152 and 153 or the negative-side holding circuits 154, 155 and 156, and supply the selected terminal voltage values to the difference circuits 171, 172 and 173 of the synchronous control circuit 17.

In the synchronous control unit 17, the difference circuits 171, 172 and 173 calculate the differences between the voltage values (the terminal voltage values) held in the positive-side holding circuits 151, 152 and 153 or the negative-side holding circuits 154, 155 and 156 and supplied from the selection circuits 157, 158 and 159 and the detected voltage values (the terminal voltage values) directly supplied from the detection amplifiers 141, 142 and 143. Specifically, in the difference circuits 171, 172 and 173, the difference between the terminal voltage value at the last detecting point and the terminal voltage value at the present detecting point is supposed to be calculated.

The comparators 175, 176 and 177 compare the reference voltage value set by the reference voltage source 174 for a determination of the rated speed with each difference voltage value of the difference circuits 171, 172 and 173, and supply the reference voltage value as it is when the comparison results in 0, that is, in the absence of the error, or the voltage value obtained by adding or subtracting the error factor to or from the reference voltage value in the presence of the error to the control circuit 178.

The control circuit 178 controls such that the synchronous operation is conditioned to be stable before the rotor of the motor 10 causes step out from the synchronous operation, by correcting the synchronizing reference voltage value of the reference voltage source 111 based on the result of each comparison by the comparators 175, 176 and 177 to change, to the appropriate frequency, the synchronizing reference signal specified as the basic operating time unit in the case of the synchronous driving, and also corrects, when the speed difference of the operation speed of the rotor from the arbitrarily determined rated synchronous speed is caused, the reference voltage value (the difference reference value) of the reference voltage source 174 depending on the speed difference. When the occurrence of the abnormal condition, such as the step out, us detected, the abnormal detection signal is further outputted to the protection apparatus 31 and the alarm apparatus 32.

As described above, in consideration of the fact that the motor, such as the fan motor and the vibrating motor with the relatively small load variations, allows for the operation in the correct phase relation without adjusting the phase relation, the brushless motor driving apparatus of a sensorless system according to the present embodiment employs the synchronous system that, after starting the motor on the basis of the initial starting frequency, changes the frequency of the synchronizing reference signal generated by the synchronizing reference signal generation unit 11 from the initial starting frequency toward the rated frequency to drive the motor on the basis of the changed frequency.

Then, in carrying out the above synchronous system, when detecting the back electromotive force generated in the driving coils U, V and W of the brushless motor 10, the zero-cross detection of the back electromotive force is not performed, but the phase error is detected by comparing the back electromotive force level itself with the back electromotive force level of the same phase in the last condition (the last detecting point), and the frequency of the synchronizing reference signal specified as the reference operating time unit is changed to the appropriate frequency on the basis of the result of the comparison, that is, the frequency of the synchronizing reference signal is controlled so as to eliminate the phase error, thereby ensuring that the synchronous operation is conditioned to be stable before the rotor of the motor 10 causes the step out from the synchronous operation, so that the following operational effects are obtained.

Referring to the operational effects by contrast with the conventional technology that performs the zero-cross detection of the back electromotive force, first of all, the offset correction circuit of the detection amplifiers 141, 142 and 143 for detecting the back electromotive force becomes unnecessary. When performing the zero-cross detection of the back electromotive force, the presence of an offset in the detection amplifiers causes out-of-timing of the zero-cross detection, leading to a failure of an accurate zero-cross detection, so that the offset correction circuit for correcting the offset of the detection amplifiers is supposed to be indispensable. On the contrary, when comparing the present detected voltage value with the last detected voltage value on the same phase, even in the presence of the offset in the detection amplifiers 141, 142 and 143, the detected voltage values are allowed to always bear the same offset component, which is then supposed to be canceled at the time of a difference detection, so that the back electromotive force value may be detected accurately without providing the offset correction circuit.

Secondly, the noise removal circuit for external noise also becomes unnecessary. When performing the zero-cross detection of the back electromotive force, there is the need for a period during which the back electromotive force is sensed continuously until the detected voltage value of the back electromotive force crosses the neutral voltage, so that a weakness to the external noise is presented, in which case, the noise removal circuit for the external noise also is supposed to be indispensable. On the contrary, when detecting the back electromotive force level itself, an arbitrary short period is enough to satisfy the detection of the back electromotive force value, so that the strength against the external noise is acceptable, resulting in no need for the noise removal circuit for the external noise. Even if the noise removal circuit is applied, for instance, a circuit having an extremely simple circuit configuration is only needed.

Further, the driving phase correction circuit also becomes unnecessary. When performing the zero-cross detection of the back electromotive force, the most efficient driving point is assumed to be a position determined by a delay of an electrical angle 30° phase from a rotation angle after the zero-cross detection, so that the driving phase correction circuit is required for creating the delay of the 30° phase. On the contrary, when employing the synchronous system that detects the back electromotive force level itself, the drive control is performed with a loose level change depending on the terminal voltage value, in which case the synchronous operation condition is already recognized, so that it is not necessary to delay the phase by 30°, resulting in no need for the driving phase correction circuit.

As described the above, according to the brushless motor driving apparatus of the present embodiment, some function circuits that were required for the brushless motor driving apparatus according to the related art and that performs the zero-cross detection of the back electromotive force, that is, the function circuits such as the offset correction circuit, the external noise removal circuit and the driving phase correction circuit, become unnecessary, so that the brushless motor driving apparatus may be implemented with the relatively simple circuit configuration. As a result, a low power consumption and a downsizing and a cost reduction of the present driving apparatus can be achieved.

Further, the brushless motor driving apparatus according to the present embodiment is more tolerant to a motor coil connection method and the number of driving phases as compared with the conventional apparatus. Specifically, synchronous control is performed without capturing the neutral point of the brushless motor 10, that is, the potential of a common connection point (O point in FIG. 1) of the driving coil of each phase, so that an application to a delta connection fit for the purpose of providing a high torque type, for instance, is also possible. Further, an application to a multiple-phase brushless motor other than the three-phase brushless motor is possible without being limited to the three-phase brushless motor. Furthermore, an application to a sensorless driving of a single-phase brushless motor is also possible in such a manner as to provide positively a driving/breaking period.

Furthermore, synchronous control is performed without capturing the neutral voltage of the brushless motor 10, so that the connection adapted to a capturing of the neutral voltage may be eliminated. Accordingly, in the case of the three-phase motor, for instance, the number of connections to connect between the present driving apparatus and the brushless motor 10 may be reduced from the conventionally required four connections to three connections, and the number of terminal pins also may be reduced by one when the IC implementation of the present driving apparatus is attained. As a result, the degree of freedom of the circuit (IC) arrangement is increased, so that it is allowable to implement a driving apparatus suitable for integrating a driving IC into the motor apparatus.

Furthermore, the synchronous control circuit 17 operates to create a sensitivity difference depending on the rotational speed of the brushless motor 10 by controlling the difference reference voltage value depending on the speed difference of the operation speed of the rotor from the rated synchronous speed. Specifically, the step out is hardly caused when the rotational speed is low, and, conversely, the higher rotational speed causes the step out easily, so that the setting of the difference reference value so as to bring about the higher sensitivity in the high rotational speed region leads to increased accuracy of the synchronous operation control.

SECOND EMBODIMENT

Figure 4:
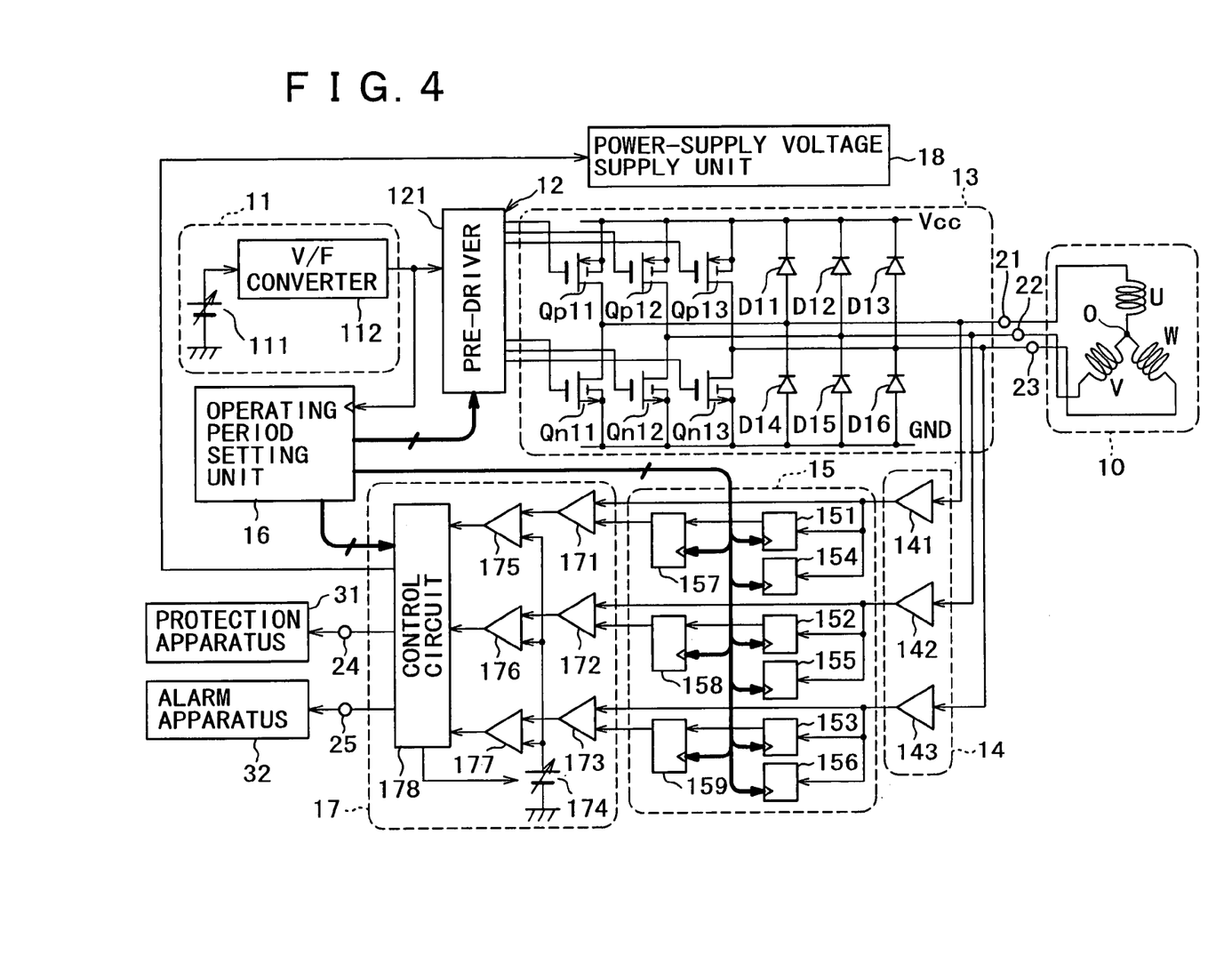
FIG. 4 is a block diagram showing an instance of a configuration of a brushless motor driving apparatus according to a second embodiment of the present invention.

FIG. 4 is a block diagram showing an instance of a configuration of a brushless motor driving apparatus according to a second embodiment of the present invention. In FIG. 4, portions similar to those shown in FIG. 1 are denoted by the same reference numerals. In the second embodiment, the three-phase DC brushless motor 10 having the rotor provided with the magnet and the stator provided with the three-phase driving coils U, V and W also is applied to the object of driving.

While the brushless motor driving apparatus according to the first embodiment employs the configuration that controls the frequency of the synchronizing reference signal specified as the reference operating time unit on the basis of the result of the comparison between the back electromotive force values of the same phase, the brushless motor driving apparatus according to the second embodiment employs a configuration that, assuming that the voltage value of the power-supply voltage Vcc supplied from a power-supply voltage supply circuit 18 to the drive output unit 13 is variable, controls the voltage value of the power-supply voltage Vcc based on the result of the comparison between the back electromotive force values of the same phase.

As described above, even in the case of an employment of the configuration that controls the voltage value of the power-supply voltage Vcc of the drive output unit 13 on the basis of the result of the comparison between the back electromotive force values of the same phase, the synchronous operation also may be conditioned to be stable before the rotor of the motor 10 causes the step out from the synchronous operation, like the case of the first embodiment. The configuration in the case of the second embodiment is not of the system that performs the zero-cross detection of the back electromotive force, but of the synchronous system that detects the phase error by comparing the back electromotive force level itself with the back electromotive force level of the same phase in the last condition (the last detecting point), and performs the control on the basis of the result of the comparison, so that the same operational effects as those in the first embodiment are supposed to be obtained.

It is noted that, while each of the above embodiments has been described by supposing the configuration that obtains the results of the comparison between the back electromotive force values on all the phases in the three-phase DC brushless motor, for instance, to perform control on the basis of the results of the comparison, it is not always necessary to obtain the results of the comparison between the back electromotive force values on all the phases, and it is also allowable to employ a configuration that obtains a result of a comparison between the back electromotive force values on at least one phase to perform the control on the basis of the result of the comparison, in which case, approximately the same operational effects as those in each of the above embodiments may be obtained.

The brushless motor driving apparatus of the sensorless system according to each of the above embodiments is supposed to be suitably available as a motor driving apparatus for, in particular, the brushless motor with the relatively small load variations, such as a fan motor for driving a cooling fan integrated into various electronic apparatuses, such as a personal computer, for instance, and a vibrating motor mounted, as a vibration source of a vibrator that alerts the user to the reception, in the mobile terminal, such as the mobile phone. However, the motor as the object of driving is not limited to the fan motor and the vibrating motor, and an application to all brushless motors with relatively small load variations is also possible.

Figure 5:
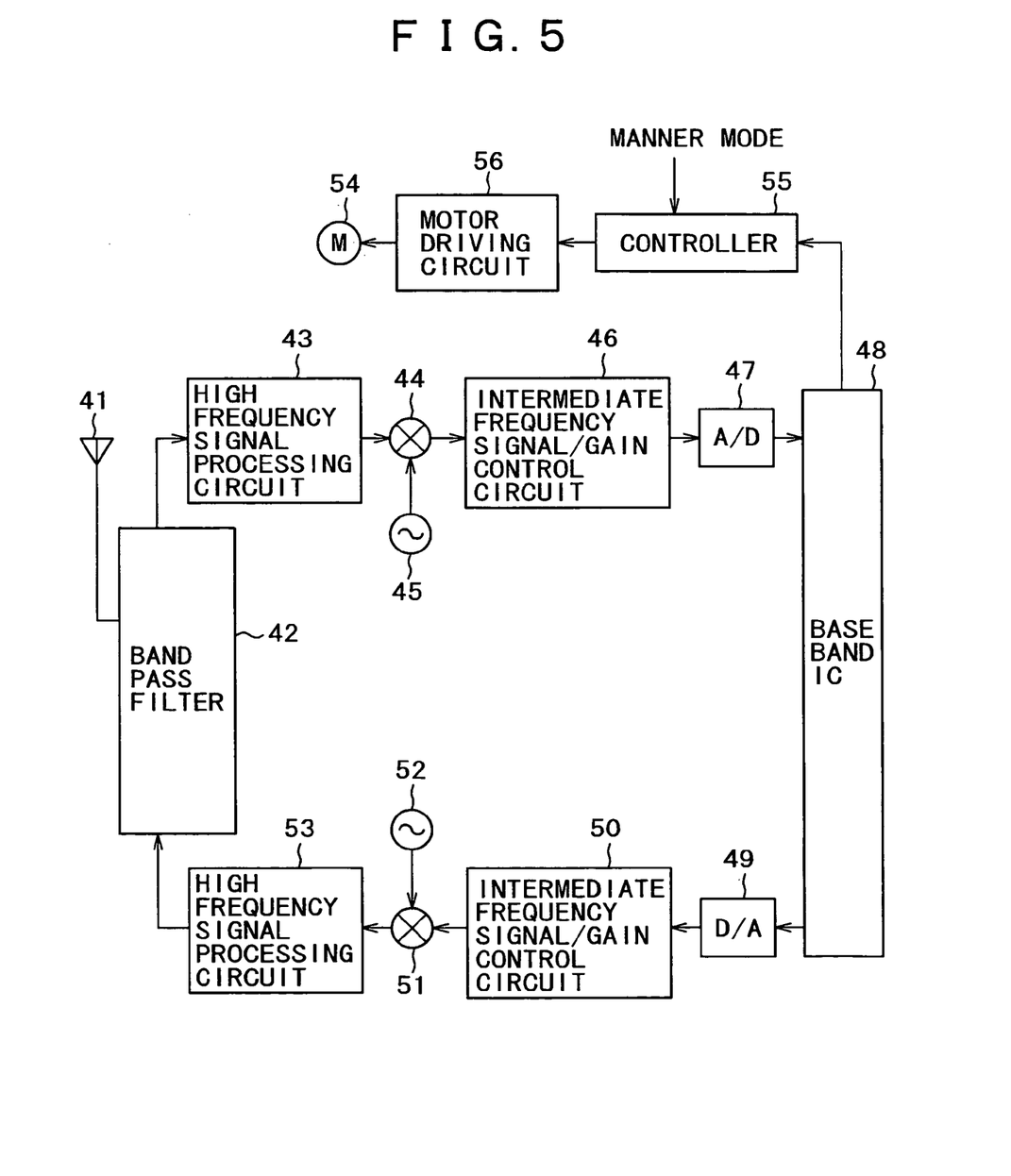
FIG. 5 is a block diagram showing an instance of a configuration of an RF front-end unit in a mobile phone according to the present invention.

FIG. 5 is a block diagram showing an instance of a configuration of a RF front-end unit in a mobile terminal, such as a mobile phone, for instance, mounted with the brushless motor driving apparatus of a sensorless system according to each of the above embodiments.

In FIG. 5, a wave received through an antenna 41 is supplied, through a band pass filter 42 used in common for transmission and reception, to a mixer 44 after a prescribed signal processing by a high frequency signal processing circuit 43. In the mixer 44, a mixing with a local oscillation frequency supplied from a local oscillator 45 is performed for a conversion into an intermediate frequency (IF), which is digitized by an A/D converter 47 after a signal processing, such as an orthogonal demodulation by an intermediate frequency/gain control circuit 46, and is then supplied to a base band IC 48.

On the other hand, at a transmission side, a digital IF signal supplied from the base band IC 48 of a previous step is converted by a D/A converter 49 into an analog signal, which is supplied to a mixer 51 after a signal processing, such as an orthogonal modulation by an intermediate frequency/gain control circuit 50. In the mixer 51, a mixing with a local oscillation frequency supplied from a local oscillator 52 is performed for a conversion into an RF signal. Then, the RF signal is supplied to the antenna 41 through the band pass filter 42 after a prescribed signal processing by a high frequency signal processing circuit 53 and transmitted as a radio wave through the antenna 41.

Incidentally, the mobile terminal, such as the mobile phone, is generally mounted with a vibrator function that alerts the user to the reception by vibrations, from a standpoint of manners, in addition to a function that alerts the user to the reception by sounding. Then, the vibrating motor is applied as a vibration source of the vibrator. The mobile phone of the above configuration according to the present application embodiment is also mounted with a vibrating motor 54 that transmits the vibrations to a casing. For the vibrating motor 54, the use of the brushless motor of the sensorless system is effective and advantageous in achieving a cost reduction and a downsizing of a mobile phone because there is no need for a position detection.

Referring back to FIG. 5, a reception detection signal is supplied from the base band IC 48 to a controller 55 at the time of reception. When receiving the reception detection signal from the base band IC 48, the controller 55 normally outputs a drive instruction to a ringtone driving circuit (not shown) to alert the user to the reception by sounding, whereas when a manner mode is in an operative condition, it outputs the drive instruction to a motor driving apparatus 56 to alert the user to the reception by vibrations. The motor driving apparatus 56 drives the vibrating motor 54 in response to the drive instruction from the controller 55. The brushless motor driving apparatus according to the first or the second embodiment described above is available as the motor driving apparatus 56.

In this manner, the use of the brushless motor driving apparatus according to the first or the second embodiment described above as the driving apparatus 56 for the vibrating motor 54 that transmits the vibrations to the casing enables the above brushless motor driving apparatus to drive stably the vibrating motor 54 with the extremely simple circuit configuration, leading to minimum designing of a circuit scale of the motor driving apparatus 56, so that the above motor driving apparatus is suitable for application to the mobile terminal such as the mobile phone having a tendency to more downsizing.

In particular, no need to capture the neutral voltage from the vibrating motor 54 brings about extremely large supplementary effects, such as a simplification of the circuit configuration, a reduction in the number of connections to connect between the vibrating motor 54 and the motor driving apparatus 56, a simplification of an interconnection work with the reduction of the number of connections, a cost reduction for the motor itself resulting from no need for the neutral voltage capturing at the vibrating motor 54-side, etc. As a result, the brushless motor driving apparatus of the present invention largely contributes to a downsizing and cost reduction of the mobile phone itself.

Incidentally, while the present application embodiment has been described by taking the case of the application to the mobile phone, the present invention is not limited to the above application embodiment, and it may be applied to whole mobile terminals, each having the vibrator function with the vibrating motor as the vibration source.

INDUSTRIAL APPLICABILITY

As has been described in the foregoing, according to the present invention, when detecting the back electromotive force generated in the driving coils, zero-cross detection of the back electromotive force is not performed, but the phase error is detected by comparing the back electromotive force level itself with the back electromotive force level of the same phase in the last condition, and the frequency control of the synchronizing reference signal is performed on the basis of the result of the comparison to ensure that the synchronous operation is conditioned to be stable before the rotor of the motor causes the step out from the synchronous operation, whereby some function circuits required for the zero-cross detection of the back electromotive force become unnecessary, so that the brushless motor driving apparatus may be implemented with the relatively simple circuit configuration, resulting in an achievement of the low power consumption, and the downsizing and cost reduction of the present driving apparatus.

The invention claimed is:

1. A driving apparatus for driving a single-phase or multiple-phase motor having a rotor provided with a magnet and a stator provided with one or more driving coils, characterized by having:
    synchronizing reference signal generating means which generates a synchronizing reference signal specified as a basic operation time unit;
    driving control means which controls an energizing to said driving coils in synchronization with said synchronizing reference signal;
    terminal voltage detecting means which detects a terminal voltage value on arbitrary one or more phases in said driving coils;
    terminal voltage holding means which holds the voltage value detected by said terminal voltage detecting means;
    operation period setting means which sets a period that said driving control means is conditioned to be non-drive on at least one phase of said driving coils and a period that said terminal voltage detecting means is conditioned to be operative during the period in the non-drive condition; and
    synchronous control means which compares, on the same phase, a difference between the voltage value detected by said terminal voltage detecting means and the voltage value held in said terminal voltage holding means with a reference value, and controls a frequency of said synchronizing reference signal on the basis of a result of the comparison.

2. The motor driving apparatus according to claim 1, wherein said synchronous control means corrects, when a speed difference of an operation speed of said rotor from an arbitrarily determined rated synchronous speed is caused, said reference value depending on the speed difference.

3. The motor driving apparatus according to claim 1, wherein said synchronous control means outputs an abnormality detection signal when an abnormality was detected on the basis of said result of the comparison during a rated synchronous operation.

4. The motor driving apparatus according to claim 1, wherein said terminal voltage holding means is composed of two systems including a system of holding a positive-side terminal voltage value and a system of holding a negative-side terminal voltage value.

5. A motor driving apparatus for driving a single-phase or multiple-phase motor having a rotor provided with a magnet and a stator provided with one or more driving coils, characterized by having:
    drive output means which supplies a drive current to said driving coils;
    power-supply voltage supply means which supplies a power-supply voltage to said drive output means;

terminal voltage detecting means which detects a terminal voltage value on arbitrary one or more phases in said driving coils;

terminal voltage holding means which holds the voltage value detected by said terminal voltage detecting means;

operation period setting means which sets a period that a driving control means is conditioned to be non-drive on at least one phase of said driving coils, and a period that said terminal voltage detecting means is conditioned to be operative during the period in the non-drive condition; and synchronous control means which compares, on the same phase, a difference between the voltage value detected by said terminal voltage detecting means and the voltage value held in said terminal voltage holding means with a reference value, and controls the power-supply voltage of said powe-supply voltage supply means on the basis of a result of the comparison.

6. The motor driving apparatus according to claim 5, wherein said synchronous control means corrects, when a speed difference of an operating speed of said rotor from an arbitrarily determined rated synchronous speed is caused, said reference value depending on the speed difference.

7. The motor driving apparatus according to claim 5, wherein said synchronous control means outputs an abnormality detection signal, when an abnormality was detected on the basis of said result of the comparison during a rated synchronous operation.

8. The motor driving apparatus according to claim 5, wherein said terminal voltage holding means is composed of two systems including a system of holding a positive-side terminal voltage value and a system of holding a negative-side terminal voltage value.

9. A mobile terminal mounted with a vibrating motor that includes a single-phase or multiple-phase motor having a rotor provided with a magnet and a stator having one or more driving coils and applies vibrations to a casing, and a motor driving apparatus for driving said vibrating motor at the time of a reception, characterized in that:

said motor driving apparatus has:

synchronizing reference signal generating means which generates a synchronizing reference signal specified as a basic operation time unit;

driving control means which controls an energizing to said driving coils in synchronization with said synchronizing reference signal;

terminal voltage detecting means which detects a terminal voltage value on arbitrary one or more phases in said driving coils;

terminal voltage holding means which holds the voltage value detected by said terminal voltage detecting means;

operation period setting means which sets a period that said driving control means is conditioned to be non-drive on at least one phase of said driving coils and a period that said terminal voltage detecting means is conditioned to be operative during the period in the non-drive condition; and synchronous control means which compares, on the same phase, a difference between the voltage value detected by said terminal voltage detecting means and the voltage value held in said terminal voltage holding means with a reference value, and controls a frequency of said synchronizing reference signal on the basis of the result of the comparison.

10. A mobile terminal mounted with a vibrating motor that includes a single-phase or multiple-phase motor having a rotor provided with a magnet and a stator provided with one or more driving coils and applies vibrations to a casing, and a motor driving apparatus for driving said vibrating motor at the time of a reception, characterized in that:

said motor driving apparatus has:

drive output means which supplies a drive current to said driving coils;

power-supply voltage supply means which supplies a power-supply voltage to said drive output means;

terminal voltage detecting means which detects a terminal voltage value on arbitrary one or more phases in said driving coils;

terminal voltage holding means which holds the voltage value detected by said terminal voltage detecting means;

operation period setting means which sets a period that a driving control means is conditioned to be non-drive on at least one phase of said driving coils, and a period that said terminal voltage detecting means is conditioned to be operative during the period in the non-drive condition; and synchronous control means which compares, on the same phase, a difference between the voltage value detected by said terminal voltage detecting means and the voltage value held in said terminal voltage holding means with a reference value, and controls the power-supply voltage of said power-supply voltage supply means on the basis of the result of the comparison.

* * * * *